United States Patent

[11] 3,574,311

[72] Inventor Gordon J. Fairbanks
        Indianapolis, Ind.
[21] Appl. No. 804,417
[22] Filed Mar. 5, 1969
[45] Patented Apr. 13, 1971
[73] Assignee Stewart-Warner Corporation
        Chicago, Ill.

[54] SPOOL VALVE
    3 Claims, 3 Drawing Figs.
[52] U.S. Cl. .................................................. 137/625.68,
        251/86
[51] Int. Cl. ............................................... F16k 11/07
[50] Field of Search ........................................ 137/625.68,
        625.67, 625.69, 625.35, 625.6, 625.63, 625.64,
        625.65, 625.66; 251/325, 86, 84

[56] References Cited
    UNITED STATES PATENTS
    763,694   6/1904   Robinson .................. 137/625.68
    1,374,405 4/1921   Steiner ..................... 137/625.68
    1,805,392 5/1931   Douds ...................... 251/88
    2,645,450 7/1953   Chessman ................. 251/325X
    2,648,313 8/1953   Clifton ..................... 137/625.68
    2,899,980 8/1959   Loebel et al. ............. 251/86X
    2,916,050 12/1959  Ruhl ........................ 137/625.68
    2,931,673 4/1960   Gondek ................... 251/325
    3,211,183 10/1965  Eickmann ................ 137/625.68
    3,282,554 11/1966  Jones ....................... 251/88

Primary Examiner—M. Cary Nelson
Assistant Examiner—R. B. Rothman
Attorneys—Augustus G. Douvas, William J. Newman and Norton Lesser ABSTRACT: A spool valve in the form of a hollow cylinder of larger internal diameter than that of the operating shaft receiving the same, floats on one or more pins extending radially from the shaft periphery to allow the floating spool to be self-centered with respect to the cylindrical valve casing encircling the same.

INVENTOR
GORDON J. FAIRBANKS

BY A. G. Douvas

ATTORNEY

INVENTOR
GORDON J. FAIRBANKS
BY A. J. Douvas
ATTORNEY

INVENTOR
GORDON J. FAIRBANKS

SPOOL VALVE

BACKGROUND OF THE INVENTION

1. Field of the Invention

This invention relates to reciprocating spool valves and more particularly to such valves for use with extremely high pressure fluids wherein valve operation occurs under temperatures ranging from −65° F. and below to 300° F.

2. Description of the Prior Art

Spool valve have long been employed for selectively directing pressurized fluid from a source to a load device or returning exhaust fluid from the load device to an exhaust line. In many cases, the spool valve functions as the pilot valve in a fluid servosystem. Where the fluid pressure is quite low and the operating temperature is close to ambient, simplified spool valve structures are employable in which case, normally, the valve casing comprises a single casting carrying a longitudinal bore forming the valve fluid cavity with a unitary spool valve reciprocating therein to selectively couple inlet and outlet fluid ports connected to the supply and load lines. Obviously, some preciseness in manufacture is required since the spool valve has its outer surface so configured as to selectively fluid couple two or more of the axially spaced fluid ports carried by the valve casing.

Where fluid under high pressure is involved, it is necessary to incorporate sufficient seals between the axially spaced ports to prevent inadvertent flow under high pressure to other than selected ports. Further, where operations occurs over a large temperature range, the expansion and contraction of the spool valve and the casing and its supporting shaft may cause, at one extreme temperature or the other, undue wear between the reciprocating spool and the stationary casing, loss of fluid seal, or actual binding between the parts preventing normal operation. Since the valve casing normally constitutes a metal casing which is bored to form the fluid cavity and since in many cases the valve spool constitutes an enlarged diameter portion of the operating shaft, close tolerances are required between the concentric members to insure maintenance of full peripheral seals between the reciprocating spool and the stationary valve casing. Such concentricity is even harder to obtain where, due to the large fluid pressures existing under some applications, the valve casing is bored and counterbored to receive a stationary sleeve assembly made up of a single metal sleeve or a plurality of cylindrical metal segments which cooperate with individual annular seals at longitudinally spaced locations. In some cases, the segments are drilled radially and peripherally grooved, both internally and externally to define the proper fluid ports of the fluid casing, allowing delivery to and from the valve casing of the high pressure fluids controlled thereby. In addition to the controlled delivery of high-pressure fluids to a plurality of individual, longitudinally spaced ports carried by the casing and associated with the high-pressure fluid load device, it is also necessary to return the exhaust fluid from the load device to the exhaust line coupled to the valve. In the past, the spool valves carry at either end of the valve casing, exhaust ports which are selectively coupled to those ports carried by the casing inwardly thereof and connected to the load device whereby, depending upon the selective delivery of pressurized fluid to a load device the load device directs the exhaust fluid therefrom to the casing exhaust or return line.

SUMMARY OF THE INVENTION

This invention is directed to an improved spool valve assembly for high-pressure use, allowing operation over an extremely large temperature range from well below zero to several hundred degrees Fahrenheit. A valve casing defines a longitudinally extending internal fluid cavity and carries a plurality of longitudinally spaced fluid ports opening up into the cavity. An operating shaft is sealably carried by the casing and reciprocates longitudinally therein. A cylindrical spool is coaxially mounted on the shaft with its outer periphery in contact with the cavity wall. Fluid passage means carried by the spool selectively fluid couple the casing ports in response to positional shift of the shaft. The spool mounting means enables axial movement of the spool in response to axial movement of the valve shaft and permit, limited lateral shifting of the shaft relative the spool to self-center the spool thus eliminating the need for concentricity tolerances while preventing side forces from acting on the operating shaft during use.

Preferably the spool is in the form of a hollow cylinder whose internal diameter is in excess of the diameter of the shaft carrying the same. A pin fixedly carried by the shaft has ends extending radially therefrom which are received by diametrically opposed slots formed in the hollow cylindrical spool whose axial and transverse dimensions are larger than the pin diameter to form the floating connection therebetween. A single casing exhaust port is carried at one end of the valve casing and opens up into the casing cavity whereby the hollow cylindrical spool allows exhaust fluids to pass freely between itself and the smaller diameter shaft for selective fluid coupling of the fluid load ports to the exhaust fluid returning to the same valve.

DESCRIPTION OF THE PREFERRED EMBODIMENT

Figure 1:
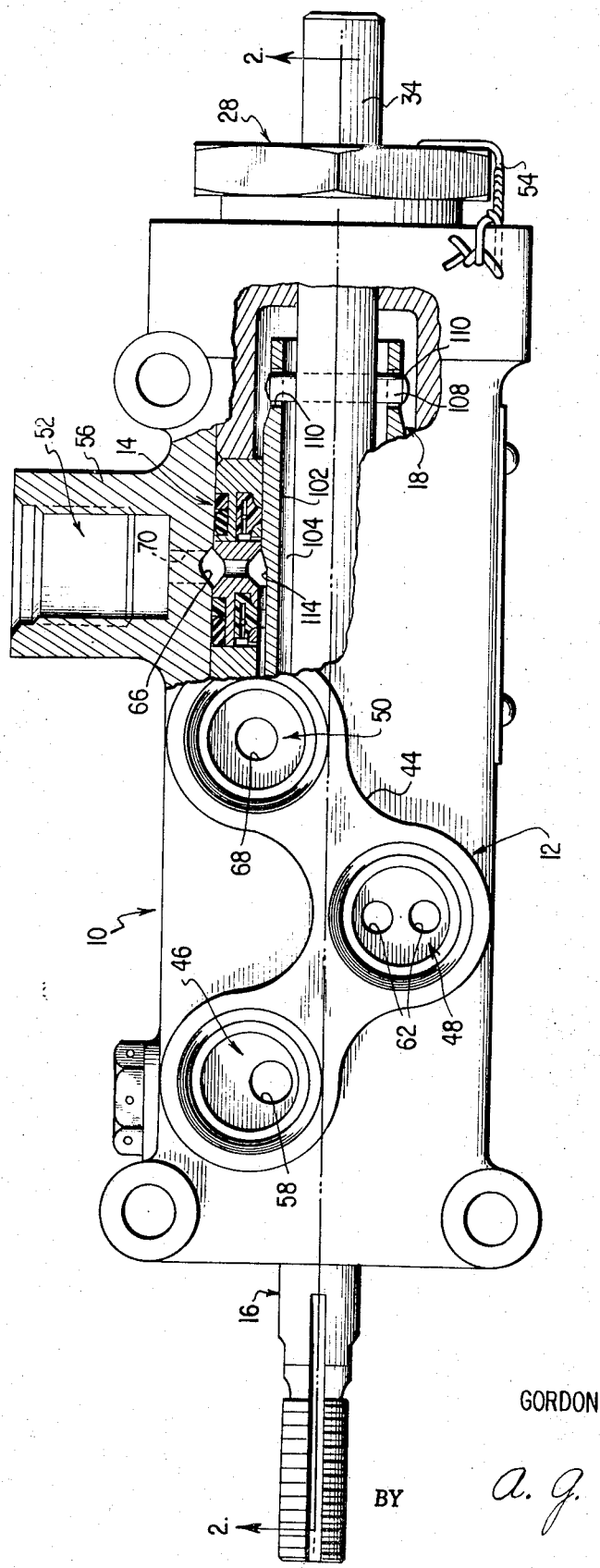
FIG. 1 is a plan view, partially in section of the improved spool valve of the present invention, with the spool at the extreme right-hand position.

Referring to the drawings, the high-pressure spool valve of the present invention, for application over a wide range of temperatures from the cryogenic range to that of several hundred degrees Fahrenheit, is indicated generally at 10 and comprises four principal components, a cast metal valve casing 12, a valve casing sleeve assembly 14, an operating shaft 16, and a self-centering floating spool 18 positioned on shaft 16.

Figure 2:
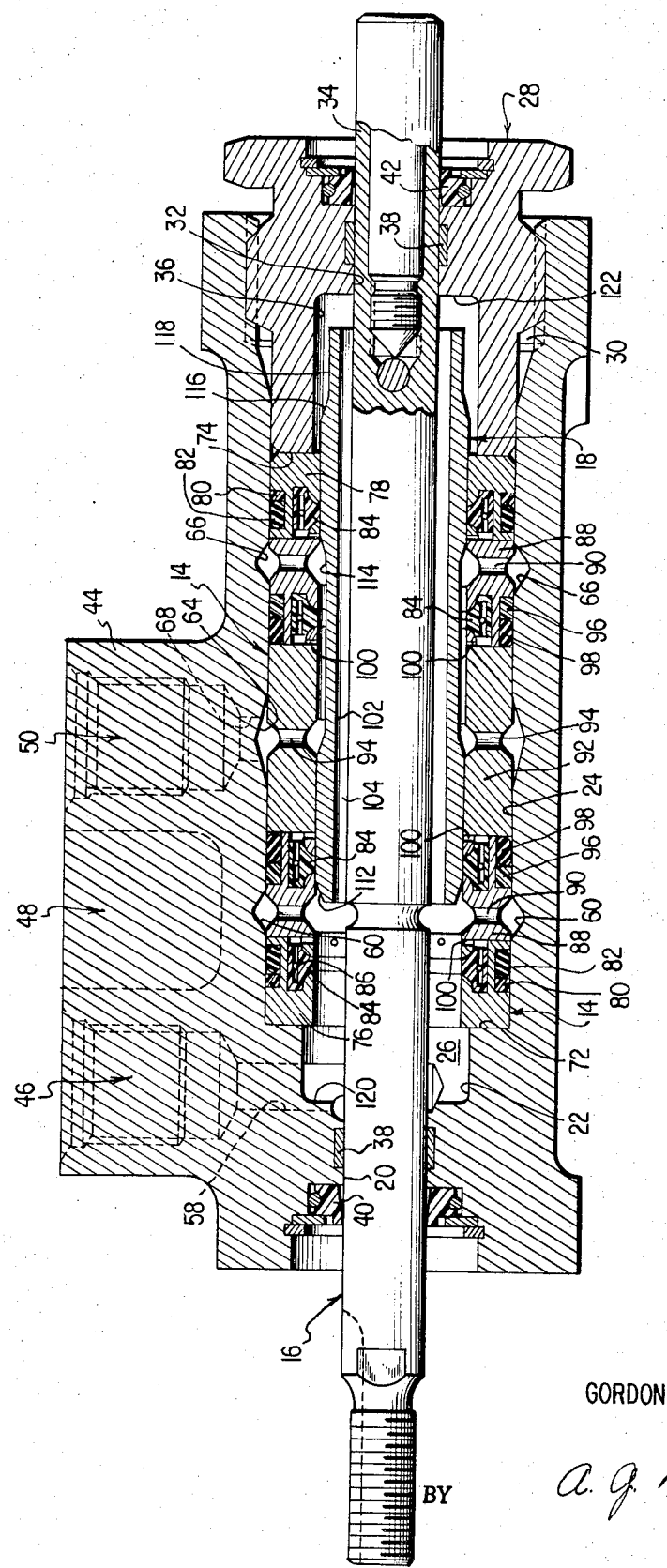
FIG. 2 is a side elevational view, in section, of the valve shown in FIG. 1 taken about lines 2−2.

The cast metal valve casing 12, which may be either rectangular or cylindrical in configuration, is provided with a bore 20, FIG. 2, on the order of the diameter of shaft 16, which receives the shaft for reciprocation within a valve casing fluid cavity 26 defined by counterbore 22, sleeve assembly 14 carried by a second counterbore 24, and a threaded end plug 28 at the right-hand end thereof. In this respect the valve casing 12 is further counterbored at 30 and threaded to threadably receive the end plug 28, which itself is bored at 32 similar to bore 20 of casing 12, to receive shaft support end 34 and is counterbored at 36 at its inner end. Plug 28 supports the operating shaft 16 for limited reciprocation, the shaft sliding upon Teflon bearings 38 carried by peripheral recesses within bores 20 and 32 of the casing and valve plug, respectively. Wiper rings 40 and 42 are provided at the left-hand end of the valve casing and within the valve plug 28, to prevent excessive wear on bearings 38 and bores 20 and 32. Some leakage of high-pressure fluid helps to blow any accumulated dirt from wiper rings 40 and 42.

Figure 3:
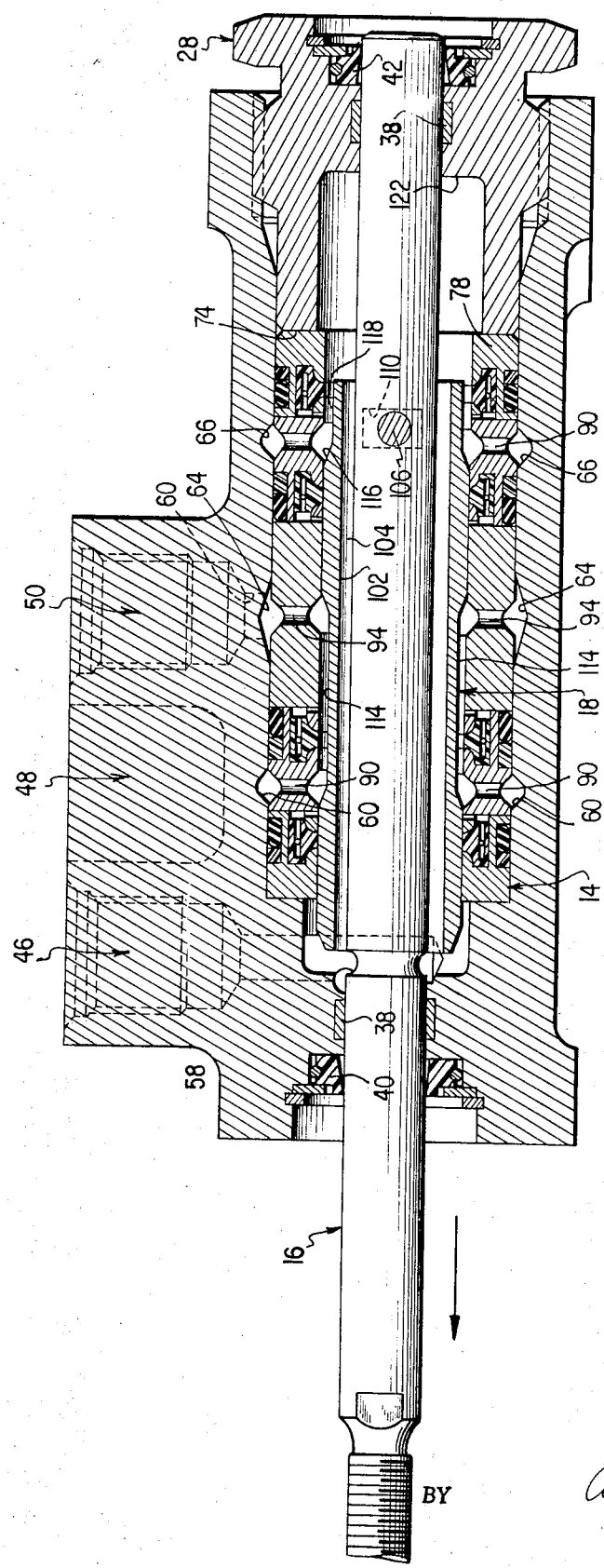
FIG. 3 is a sectional, side elevational view similar to that of FIG. 2, with the spool in its extreme left-hand position.

The valve casing 12 is provided with an irregular, radially projecting portion 44 extending from its upper surface, as seen in FIG. 3, which carries respectively from left to right the valve casing exhaust port 46, a No. 1 load port 48, as seen in FIG. 1, which acts either as an inlet or an outlet, depending upon whether it is delivering high pressure fluid to the load device or receiving exhaust fluid for selectively delivering the same to the common valve casing exhaust port 46. The valve casing pressurized working fluid inlet port 50 is to the right of the No. 1 load port 48 and beyond this, as seen in FIG. 1, and extending at right angles to the axis of ports 46, 48 and 50 is No. 2 load port 52, which is also coupled to the load device (not shown) and acts either as a high-pressure working fluid delivery port or an exhaust fluid inlet port to the valve casing, depending upon the position of valve spool 18. Since exhaust port 46 is open to atmosphere and connected at all times to cavity 26, the internal pressure on wiper rings 40 and 42 is only momentary at the time the valve exhausts and is a function of the pressure drop of the system and the volume of the system connected to ports 48 and 52. The No. 2 load port 52 is formed within a radially extending portion 56 which, as stated previously, is at right angles to section 44 carrying ports 46, 48 and 50.

As further seen in FIG. 1, once the valve end plug 28 is threadably secured in position with respect to valve casing and the sleeve assembly 14, it is prevented from working loose by the twisted wire 54 which couples the same to the valve casing 12. The internal surface configurations of ports 46, 48 50 and 52 are generally similar to receive tubular fittings (not shown) of a conventional type for fluid connecting the valve 10 to the exhaust line, various load lines and the pressurized fluid supply line (not shown). The valve casing 12 may be unitary or formed of a plurality of parts which are sealably coupled together if desired. The valve casing exhaust port 46 carries an offset bore or hole 58 at the bottom thereof, for fluid coupling the port to the internal valve casing cavity 26. The counterbore 24 of valve casing 12 is provided with a peripheral recess or groove 60 and the No. 1 load port 48 carries a pair of bores or openings 62, FIG. 1, which open up into the annular groove 60. Likewise, counterbore 24 has a second annular groove 64 positioned to the right of groove 60 and a third annular groove 66 to the right of groove 60 and a third annular groove 66 to the right of that both formed within its periphery. The peripheral, annular groove 64 is fluid coupled by hole 68 to the valve casing inlet or supply pressure port 50 while the peripheral groove 66 is fluid coupled by opening 70 to the No. 2 load port 52.

Due to the high pressure of the working fluid and the extreme temperature range at which the spool valve operates, the valve incorporates a specially formed valve casing sleeve assembly 14 which is locked in position with its left-hand end abutting a shoulder 72 formed between casing counterbore sections 22 and 24. The sleeve assembly is built up by inserting a series of annular segments, backup rings, rubber seals, grooved and radially perforated valve casing port defining rings, rubber O-rings, etc., or by forming a sleeve assembly in cylindrical form as a complete assembly prior to insertion of the same by sliding it within the counterbore 24. Subsequent to its positioning with the left-hand end in abutting contact with the shoulder 72, the end plug 28 is threadably inserted within the right-hand end of the valve casing until its inner end 74 abuts the right-hand end of the sleeve assembly 14 under a torque of 125 to 150 inch pounds. During insertion, bore 32 of the plug 28 receives the support end 34 of the operating shaft 16.

Specifically, the valve casing sleeve assembly 14 carries left and right-hand end segments 76 and 78 formed of metal which carry outer peripheral cavities receiving split Teflon backup rings 80 and rubber O-rings 82, respectively. Interiorly of the same are provided, Teflon seals 84 carrying a helical wound spring 86 on its circular periphery, the cross section of the seal being T-shaped with the open end facing inwardly. They are, however, a special size and shape developed for this particular application. The T-shaped cross section is to lock the seal in place and prevent its being blown out. The extra narrow sealing lip is to reduce the unsupported area and prevent its being ruptured at the moment the spool leaves the lip and while the seal is still pressurized. Inwardly of these members are load-port-defining metal elements or segments 88 which are annular in form, grooved peripherally on their inner and outer surfaces and carry spaced radial perforations or holes 90 allowing pressurized fluid to move radially outward into port recesses 60 and 66, respectively. Elements 88 abut on each side of a central, annular metal segment or section 92 which is also centrally grooved at opposed inner and outer peripheral areas and carries a series of radial holes or perforations 94 for the same purpose as holes 90 with respect to elements 88. The annular segments 88 also carry inwardly directed Teflon seals 84, solid Teflon backing rings 96 and rubber O-rings 98 at their outer periphery for sealing purposes in a similar manner to rubber O-rings 82. Further, small air bleed holes 100 occur at the inner seal area to permit air pressure to be built up within the U-shaped inner ring seals 84.

An important aspect of the present invention resides in the configuration of the spool 18 and its method of attachment to the reciprocating operating shaft 16. In this respect, unlike conventional spool valve constructions, the spool is not a radially enlarged section of the operating shaft but constitutes an independent element which floats on the seals to insure proper positioning of the spool regardless of any eccentricity between itself and the reciprocating shaft 16. The spool 18 is formed of metal in the form of a hollow cylinder having an internal diameter which is in excess of the diameter of the operating shaft 16 thus, it is provided with an internal peripheral surface 102 which is spaced from the shaft to define a narrow annular fluid passageway 104 throughout its length. The valve operating shaft carries near its support end 34 a transversely extending mounting pin 106, FIG. 1, having opposed ends 108 which extend radially of the shaft and are received within opposed circumferentially elongated slots 110 whose circumferential dimensions are larger than the diameter of pin ends 108. The opposed holes in the spool are larger circumferentially than the diameter of the pin to permit freedom of the spool in relation to the shaft. These holes or passageways are also not round but are actually slots so that a flat surface perpendicular to the longitudinal axis of the spool 18, shaft 16 and pin 106 and of greater perpendicular dimension than the pin diameter as seen in FIG. 3 bears against the round pin, again to permit freedom and prevent side thrust. Thus, while the spool 18 is restrained against axial movement relative to operating shaft 16, it may move radially within limits, to center itself with respect to multiple segment valve casing sleeve assembly 14. While the internal surface 102 of the hollow cylindrical spool 18 is uniform, its exterior surface is configured to facilitate movement of pressurized fluid between the longitudinally spaced ports of the valve. In this respect, its left end is beveled at 112; it is peripherally relived near the center at 114 to provide an annular fluid passage of a length on the order of the distance between the centerlines of fluid ports 48 and 50, which also corresponds to the centerline between ports 50 and 52. Near the right-hand end of the valve it is beveled at 116 and it terminates in a reduced outside diameter portion 118. Means are provided for insuring that, with the operating shaft in either extreme position, the ends of the hollow cylindrical spool 18 are spaced from respective cavity end walls 120 and 122.

In operation, it is assumed that the operating shaft 16 is positioned in its right-hand extreme position, as indicated in FIGS. 1 and 2. It is further assumed that fluid pressure is being supplied to the valve casing inlet port 50 and that a load device is coupled to the No. 1 load port 48 and the No. 2 load port 52. Also, an exhaust line (not shown) is connected to the valve casing at valve casing exhaust port 46. With high-pressure fluid being delivered to inlet port 50 and with the spool 18 carried by the operating shaft in the position shown in FIG. 2, high-pressure fluid passes through radial holes 94 and due to the presence of the peripherally relived portion 114 of the spool, the high-pressure fluid is directed to annular groove 66 where it moves through hole 70 to the No. 2 load port 52 for delivery to its associated load device (not shown). Simultaneously, the No. 1 load port 48 has its peripheral groove or recess 60 fluid coupled by means of radial holes 90 and the left-hand end of cavity 26 to the valve casing exhaust port 46 via passage 58. Assuming that the load device constitutes a servo power piston, high-pressure fluid is delivered to one side of the power piston moving the same relative to its casing and causing fluid to be exhausted from the other side of the piston which is returned to the exhaust side of the fluid control system via casing 48 and 46.

By shifting the operating shaft 16 from right to left the floating spool 18 moves to the position shown in FIG. 3 in which case, the No. 2 load port 52 is now fluid coupled via beveled surface area 116 and reduced diameter peripheral portion 118 of the spool valve to valve casing exhaust port 46 via the fluid passage 104 which exists between the valve operating shaft 16 and the inner surface 102 of the sleeve and the radial hole 58 at the left-hand end of cavity 26. At the same time, the high-pressure fluid which is being delivered to valve casing pressure inlet port 50, passes through the radial perforations 94 and the grooved peripheral portion 114 of the valve spool 18 to the No. 1 load port 48, via radial holes 90 and annular groove 60. It is thus seen that the spool valve is in the opposite state to that first described in conjunction with FIGS. 1 and 3.

While the valve assembly carries a single exhaust port, a single pressurized fluid inlet port, and a pair of load ports in axial spaced fashion and a single outer peripheral groove for selectively coupling the pressurized fluid to the individual load ports, it is obvious that the floating valve may employ a number of axially spaced, peripherally relieved ports and the valve casing may employ a much larger number of axially spaced casing ports. Further, while a single pin is carried at one end of the spool for floatably mounting the spool toe the operating shaft, multiple pins may be employed at spaced longitudinal locations or, alternatively, a single pin may be employed having but one end which extends radially from the shaft and is received within an associated spool slot.

I claim:

1. A spool valve comprising: a valve casing defining a longitudinally extending internal fluid cavity, a plurality of longitudinally spaced fluid ports carried by said casing and opening up into said cavity, an operating shaft sealably carried by said casing for longitudinal movement within said cavity, a cylindrical spool coaxial of said shaft and encircling said shaft in spaced relationship to said shaft with the outer periphery of said spool formed for selectively fluid coupling said casing ports in response to axial reciprocation of said spool, a cylindrical pin extending radially from said shaft, and a pair of opposed passageways in said spool for receiving opposite ends of said pin, each passageway having dimensions larger than said pin and defined by a flat side perpendicular to the longitudinal axis of said shaft, spool and pin with said flat side engaging said pin whereby said pin moves said spool axially in respective directions in response to axial movement of said shaft with each flat side extending beyond the periphery of said pin to enable said pin to shift relative said flat side for enabling radial and rotational movement of said shaft and pin relative said spool.

2. The spool valve as claimed in claim 1 further comprising means carried by said casing to define a central fluid pressure inlet port and a pair of pressurized fluid load outlet ports carried on either side thereof, a valve exhaust port carried by said casing to the side of one of said outlet ports opposite said central pressurized fluid inlet port, means carried by said spool for allowing the pressurized fluid load port farthest from said exhaust port to be selectively fluid coupled thereto when said spool is in one of said extreme positions, said valve casing including a first bore for receiving one portion of said shaft, a counter bore formed in said casing, a casing sleeve assembly seated in said counterbore against one end of said counterbore and having an inner diameter sized for engaging predetermined axial portions of said spool, a plurality of high-pressure seals carried at axially spaced positions along the inner and outer periphery of said casing sleeve assembly with the inner seals each having a spool-engaging surface adapted to engage a respective aligned portion of the outer surface of said spool for preventing communication between respective ones of said ports in accordance with the axial position of said spool, each inner seal having a surface of greater cross-sectional area than the respective spool-engaging surface spaced radially outwardly of said spool-engaging surface, a bleed hole passageway in each high-pressure inner seal for conveying fluid under pressure to said radially outwardly spaced surface for applying radially inwardly directed pressure to the respective spool-engaging surface for holding said spool-engaging surface in sealing engagement with a respective aligned portion of said spool, an end plug threadably carried by the end of said casing opposite said first bore and seated only against one end of said casing assembly opposite said one end of said counterbore, and a bore formed in said end plug for receiving another portion of said operating shaft.

3. The spool valve claimed in claim 2 in which said pin and said opposed passageways in said spool are located adjacent the portion of said shaft received by said end plug bore for relieving radial and rotational thrusts upon said spool resulting from eccentricities between said plug bore and said casing first bore.